May 24, 1938.  S. M. CADWELL  2,118,774

PNEUMATIC TIRE

Filed Aug. 28, 1934

INVENTOR.
SIDNEY M. CADWELL

Walter L. Pipes
ATTORNEY.

Patented May 24, 1938

2,118,774

UNITED STATES PATENT OFFICE 2,118,774

PNEUMATIC TIRE

Sidney M. Cadwell, Grosse Pointe Village, Mich., assignor, by mesne assignments, to United States Rubber Company, New York, N. Y., a corporation of New Jersey Application August 28, 1934, Serial No. 741,771

2 Claims. (Cl. 152—374)

My invention relates to pneumatic tires and more particularly to the construction of the outer or rubber portions of such tires commonly known as the tread.

At the present time there is a tendency for automobiles to be driven at higher and higher speeds and at the same time the tires supporting the automobiles are being made of increasingly large cross-sectional areas while maintaining the U- or horseshoe-shape of the fabric or carcass portions of the tires. Also, the tendency is to use flatter and wider tread surfaces on the tires. As a result, the mass of rubber in the tire treads is materially increased especially at its margins or shoulders. As the tread stock contains a relatively high percentage of carbon black and other ingredients to improve its wearing qualities, which have relatively high hysteresis losses, there is an increase in the resulting generation of heat. Considerable difficulty is experienced by reason of deterioration of such tread rubber particularly in the shoulder portions of the tires. In some instances the amount of heat generated is sufficiently great to cause a positive breaking-down or honeycombing of the tread rubber especially in the shoulder areas which are subject to the maximum flexing action. This is particularly true in large truck and bus tires where the road engaging surface of the tread is of a radius of curvature materially greater than the radius of curvature of the outer surface of the carcass thereby resulting in the formation, in cross-section, of wedge-shaped bodies of rubber disposed in the tread of progressively increasing thickness towards the shoulders of the tread.

I propose a pneumatic tire construction in which a wide and relatively flat road engaging surface is provided and a body or bodies of rubber having low hysteresis losses is or are disposed in the areas of maximum flexing between the tread surface and the carcass at the tire shoulders. A relatively uniform thickness of tread stock in combination with a carcass of conventional horseshoe-shape may be used by the interposition in the shoulder areas of bodies of rubber having lower hysteresis loss or heat generating action than the rubber tread stock. By providing the rubber of low hysteresis loss at the shoulder portion of the tire the tendency to generate heat is materially reduced as compared with the use of a solid body of tread stock.

With this construction the bodies of low hysteresis rubber may be separated so that the tread at the crown of the tire may be brought into direct engagement with the outer plies of the carcass or with breaker plies disposed adjacent to the carcass plies so that the tread rubber is securely anchored to a breaker strip or to the carcass rather than being anchored to a breaker strip disposed at a substantial distance from the carcass plies. It is to be understood that the invention is applicable in its broader aspects to various types of tires wherein it is desired to maintain a covering of tread stock of substantially uniform thickness by the interposition of rubber having a lower hysteresis loss than the tread stock between it and the carcass at the shoulder portions of the tire. "Hysteresis loss" as applied to the problem of pneumatic tires may be defined as the proportion of the energy of movement during the normal running or flexing of the tire which is converted from the movements of extension and retraction of the rubber to energy in other forms, principally heat.

The accompanying drawing illustrates certain present preferred embodiments of the invention, in which:—

Figure 1:
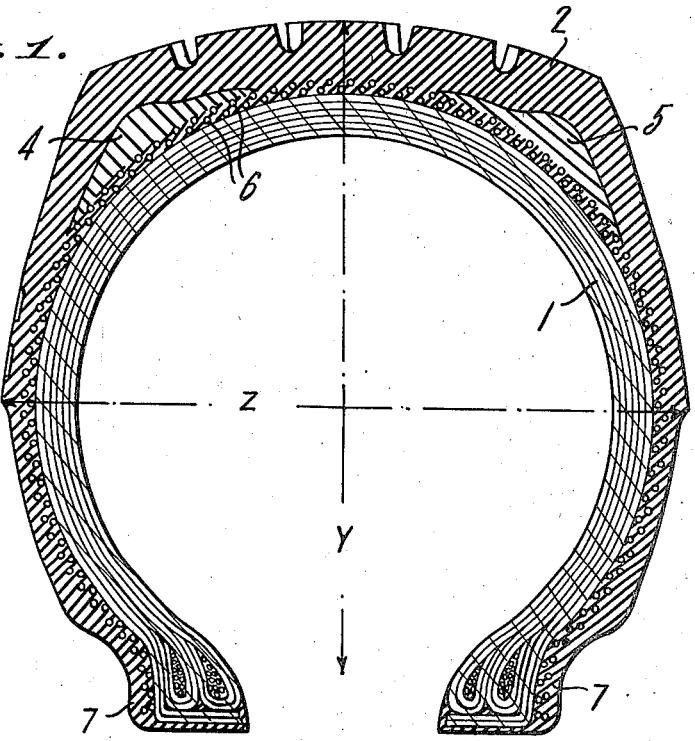
Fig. 1 is a cross-sectional view of one form of tire.

Referring to Fig. 1, a pneumatic tire embodying the invention comprises a carcass 1, a body of tread rubber 2 of relatively uniform thickness, and filler strips 4 and 5 of rubber having a lower hysteresis loss than the tread rubber disposed between the carcass and the tread rubber at substantially the shoulders of the tire and occupy the area of maximum flexing. It is to be understood that the invention in its broader aspects is not limited to the types of tire shown in the several figures, and the invention may be otherwise embodied. The carcass 1 may be of any desired number of rubberized plies, here illustrated for convenience in describing the invention as six closely assembled plies, which may be either of woven fabric or cord fabric, as desired, although cord fabric is preferable. Outside the carcass plies there are two plies 6 in which the interstices or spaces between the individual cords or threads are greater than in the interior of the carcass plies. Preferably these outer plies 6 are treated with the same type of rubber as is used for the tread stock and the inner plies are covered with a softer or zinc stock. With this construction the tread rubber 2, which is of a wear resistant character and contains a high percentage of carbon black, extends through the outer plies 6 and is bonded with the softer stock beneath the protective ply 6 therefore firmly anchoring the tread rubber to the carcass. As illustrated, the ply 6 extends around the carcass from one bead 7 to the other.

For many purposes it is desired that the tire shall have a relatively broad and flat tread in cooperation with the conventional carcass of horseshoe-shape. In many tires, particularly in bus and truck tires, it is desired to have a tire in which the ratio of the radius of curvature Y of the road engaging surface is more than 90% of the maximum diameter Z of the tire. In such a construction there is a material divergence between the road engaging surface of the tread and the contour of the carcass plies and/or the protecting plies 6. Where wear resistant tread rubber is used exclusively to fill the spaces and engage the carcass plies and/or the plies 6, the thickness of the rubber becomes excessive at the shoulders of the tire with the result that excessive hysteresis losses ensue with the resultant excessive generation of heat. In some instances the heat generated is sufficient to cause a positive deterioration of the tread stock in the shoulder areas resulting in porosity or honeycombing of the rubber. This is particularly true if the tires are run for long periods of time, at high speeds, on hot roads. With increase of speeds there is a corresponding increase in flexing action with a resultant increase in the generation of heat.

By providing the inserts 4 and 5 of rubber having a lower hysteresis loss than the rubber of road contacting portion or tread and by locating these inserts about as shown in the shoulders on the tire and by making these inserts wedge-shaped in cross-section it is possible to maintain a relatively uniform thickness of the tread rubber 2 across the entire surface of the tire. As shown, the upper surfaces of the inserts 4 and 5 are roughly parallel to the outer or road engaging surface of the tread rubber and are roughly in a horizontal plane.

A suitable composition for the inserts 4 and 5 is a stock containing 100 parts of zinc oxide by weight to each 100 parts of rubber. The rubber of the inserts 4 and 5 serves to support the tread rubber at the shoulders and at the same time reduces heat generation as compared to continuous bodies of tread rubber. With the type of tire illustrated in Fig. 1 the tread rubber is substantially anchored to the tire carcass at the crown of the tire so that firm engagement between the tread rubber and the carcass is insured.

In manufacturing a tire embodying my invention the carcass and protective plies may be assembled on a building drum or a building core, as desired. The strips 4 and 5 may then be laid on the carcass and the tread 2 placed over the carcass and strips. The assembly is then shaped, if necessary, and vulcanized in a manner well understood in the art. As an example of the efficiency of a tire embodying the present invention some mathematical values are given by way of illustration of the invention and not as a limitation thereof:

A 7.5-16 six-ply tire with a tread radius of 235% of the diameter when tested on a standard smooth laboratory wheel at a rate of speed of 45 miles per hour for resistance to separation showed an improvement of 1300% as compared with a corresponding tire not embodying the inserts of present invention. Furthermore, the tire of the present invention operates at a temperature substantially 20% lower than the comparative tire, approximate figures being 240° F. as against 299° F., respectively.

Figure 2:
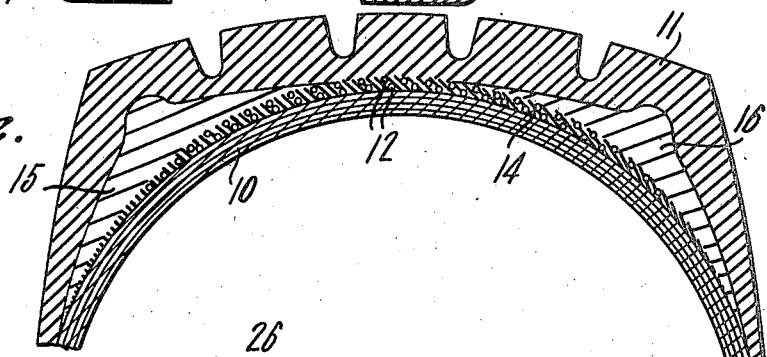
Fig. 2 is a similar view of a modified form of tire.

Referring to Fig. 2 there is illustrated a tire having a number of carcass plies 10, a tread 11, and conventional breaker strips 12 disposed at the crown of the tire. The breaker strips are preferably treated with the cushioning stock 14 of soft rubber which serves to bond the carcass and tread thereto. Preferably the breaker strips 12 are disposed closely adjacent to the stocks 10. At the shoulders of the tire there are filling strips or inserts 15 and 16 of rubber having a lower hysteresis loss than tread rubber stock similar in characteristics to the strips 4 and 5 of Fig. 1. The tire illustrated in Fig. 2 differs from the tire shown in Fig. 1 by the incorporation of conventional breaker strip 2 in lieu of the protecting plies 6 shown in Fig. 1.

Figure 3:
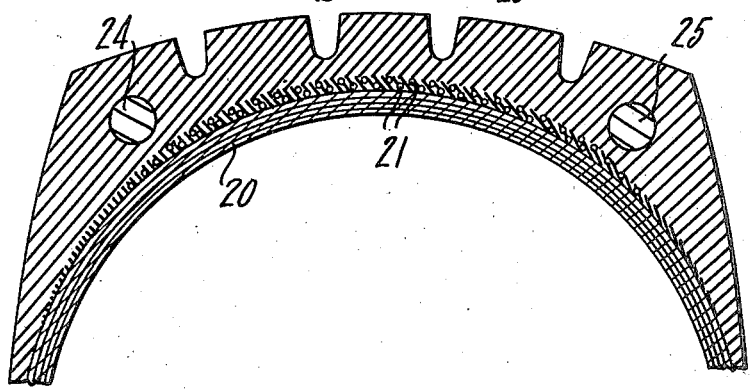
Fig. 3 is a similar view of a further modification of the invention.

Referring to Fig. 3 there is illustrated a tire having a carcass 20 and breaker strips 21 similar to those shown in Fig. 2. Inserts 24 and 25 of rubber having a low hysteresis loss are tubed or inlaid directly within the tread stock at the shoulders of the tire rather than being supplied as fillers between the carcass and the tread. However, the low hysteresis rubber inserts 24 and 25 serve to interrupt the continuity of the tread rubber stock and prevent extensive heating of the tread rubber in the shoulder portions of the tire.

In the several forms of my invention a relatively broad and flat road engaging surface of tread rubber is associated with a carcass construction of horseshoe-shape and the spaces caused by the divergence of the carcass and the road engaging surface of the tread is relieved in the shoulder portions of the tire by the presence of fillers or cushions of rubber having lower hysteresis losses than the tread rubber. The lower hysteresis rubber prevents the generation of such heat as would be generated in an equivalent body of tread rubber stock. The presence of the low hysteresis rubber at the shoulder portions of the tire permits the use of a relatively uniform thickness of tread rubber stock.

While I have shown and described certain present preferred embodiments of my invention, it is to be understood that the invention may be otherwise embodied within the spirit thereof and the scope of the appended claims.

Having thus described my invention, what I claim and desire to protect by Letters Patent is:—

1. A pneumatic tire comprising a carcass of strain resisting elements and rubber, a road engaging rubber tread having a high carbon black content, said carcass and tread having different radii of curvature whereby a body of rubber is disposed at the shoulders of the tire of materially greater radial thickness than at the crown of the tire, and a body of rubber having low hysteresis losses relative to said high carbon black rubber disposed in each of said thickened bodies of shoulder rubber in substantially radial alignment with each tire shoulder and occupying a space extending at least from approximately one-quarter to one-half of the distance from the carcass to the tread shoulder.

2. A pneumatic tire comprising a carcass of strain resisting elements and rubber, a road engaging rubber tread having a high carbon black content, said carcass and tread having different radii of curvature whereby a body of rubber is disposed at the shoulders of the tire of materially greater radial thickness than at the crown of the tire, and a body of rubber composed of substantially 100 parts of zinc oxide to 100 parts of rubber by weight and having low hysteresis losses relative to said high carbon black rubber disposed in each of said thickened bodies of shoulder rubber in substantially radial alignment with each tire shoulder and occupying a space extending at least from approximately one-quarter to one-half of the distance from the carcass to the tread shoulder.

SIDNEY M. CADWELL.